United States Patent [19]

English

[11] Patent Number: 4,739,946
[45] Date of Patent: Apr. 26, 1988

[54] FISHING REEL LINE REFILL TOOL

[76] Inventor: John P. English, 21418 Carol Sue La., Saugus, Calif. 91350

[21] Appl. No.: 924,011

[22] Filed: Oct. 28, 1986

[51] Int. Cl.$^4$ .................. B65H 49/00; A01K 97/16
[52] U.S. Cl. ................... 242/129.8; 242/106; 43/25
[58] Field of Search .............. 242/99, 106, 84.1 R, 242/129.7, 129.8; 43/25

[56] References Cited

U.S. PATENT DOCUMENTS

| | | | |
|---|---|---|---|
| 3,685,761 | 8/1972 | Zelinski | 242/84.1 R |
| 3,950,881 | 4/1976 | Hays | 43/25 |
| 3,951,354 | 4/1976 | Bagby | 242/106 |

OTHER PUBLICATIONS

Cabela's Fishing Supplies, Spring Catalog 1986, p. 53.
Owner's Manual of Siver Series Fishing Reel, Daiwa Corporation, pp. 12-13 and cover page, undated.
Advertising Brochure for Trilene Fishing Line undated.

*Primary Examiner*—Stuart S. Levy
*Assistant Examiner*—Steven M. du Bois
*Attorney, Agent, or Firm*—Gene W. Arant; Matthew F. Jodziewicz

[57] ABSTRACT

A fishing reel line refill tool for use with a fishing pole having a reel thereon, and a fishing reel line refill spool, includes a first member having a first and second section, each section being pivotally joined together at one end and having a latching means on the opposite end. The first and second sections form a first closed position wherein the sections abut to form a plurality of holes therethrough of varying diameter size, each of the holes adapted to receive therethrough in a tight friction fit a portion of the extending rod section of the fishing pole, and a second open position wherein the sections are pivotally rotated in opposite directions from their abutting relation of the first closed position. A second member is threadably mated with the first member and extends therefrom. The second member is adapted to receive thereon the refill spool in a rotatable relationship therewith. Tension means is operatively associated with the second member and the refill spool for selectively adjusting the force necessary to rotate the refill spool. The tool may be operated by an individual fisherman without assistance of any other person.

4 Claims, 5 Drawing Sheets

FISHING REEL LINE REFILL TOOL

BACKGROUND OF THE INVENTION

1. Field of the Invention

This invention relates in general to fishing accessories, and, more particularly, to a fishing reel refill tool for use in transferring fishing line from a fishing line refill spool to fishing line reels of all kinds.

2. Description of the Related Art

Prior to this invention, the refilling of fishing reel line into fishing reels was performed by non-portable electrical or mechanical machines normally anchored to counter tops in tackle or fishing shops.

Other suggested means for refilling fishing reels was, as one manufacturer recommended, to "get a friend with a pencil and have him hold and apply tension to the refill reel spool," or, "drag the line through the pages of a heavy book."

Tackle or fishing shop fishing line refilling machines are expensive and not widely in use. In many instances they are usually provided only as a convenience to the shop's customers. Even when a shopowner offers a fishing line refilling service, the cost and inconvenience discourages many fishermen from using it, resulting in a disincentive for store owners to purchase the fishing line refilling machines.

The manufacturer's suggested method of "using a friend", is both cumbersome and awkward in that it requires locating a pencil, screwdriver or a straight twig in addition to convincing a friend to assist in what is at best a tedious task. If a friend can be convinced to help, the use of his fingers to properly apply tension to maintain a correct pressure on the refill spool can be uncomfortable as well as time consuming. Another obvious difficulty in using a friend is that it requires two individuals.

The present invention overcomes all of these known difficulties of the prior art by providing a single tool that has universal application to all sizes and types of fishing reels and requires only the fisherman himself to operate. Additionally, the present invention provides a means for the fisherman to selectively adjust the tension applied to the fishing line being refilled in a uniform but adjustable manner.

SUMMARY OF THE INVENTION

In general a fishing accessory for use in transferring fishing line from a refill spool to a fishing reel constructed in accordance with the invention claimed and disclosed herein includes a first member having a first and a second section. Each of the two sections are pivotally joined together at one end and have a latching means on the opposite end. The first and second sections form a first closed position wherein the sections abut forming a plurality of holes along their abutting edges of varying diameter size. Each of the holes so formed is adapted to receive therethrough, in a tight friction fit, a portion of the extending rod section of the fishing pole. The two sections also form a second position wherein the sections are pivotally rotated in opposite directions from the abutting relation of the first closed position. A second member is threadably mated with the first member and extends therefrom. The second member is adapted to receive thereon the refill spool in a rotatable relationship therewith. Tension means is operatively associated with the second member and the refill spool for selectively adjusting the force necessary to rotate the refill spool. With the tension means, preferred to be a tensioning nut, the user is able to adjust the amount of tension and pull applied to the fishing line being wound on the fishing reel in a uniform manner.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENTS

Figure 1:
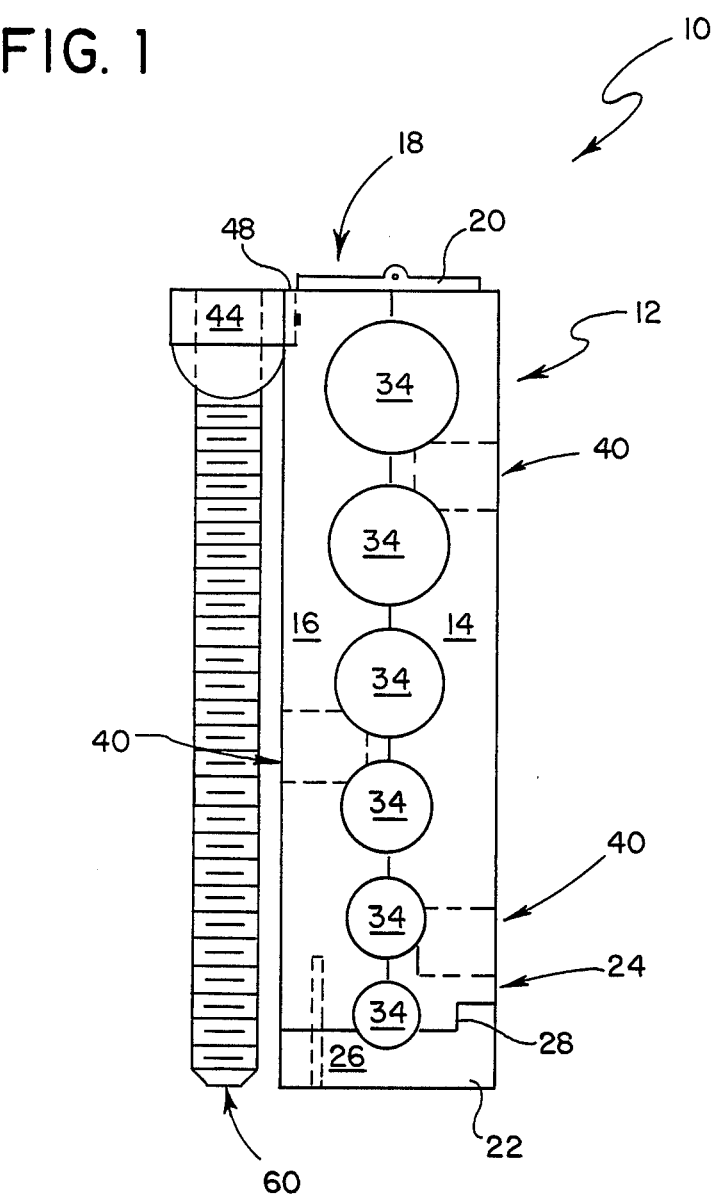
FIG. 1 is a view of a tool embodying the present invention in a folded state for storage.

FIGS. 1 through 4 illustrate the general appearance of a tool constructed in accordance with the invention disclosed and claimed herein. A preferred embodiment of the invention in a tool is generally referred to by reference numeral 10. As illustrated in FIG. 1, tool 10 is preferably constructed to be neatly stored in a compact, efficient form so that the individual component parts are not easily misplaced when the tool is not in use.

Tool 10 in its preferred embodiment is comprised of a first member 12 forming the body of the tool. Body member 12 has a first and second section 14 and 16 respectively. Each of the sections forming body member 12 are pivotally joined together at one end 18 by a hinge or pivot means 20. Latching means 22 is provided on the opposite end 24 of each section and may include having a latch member 26 integrally formed on end 24 of one of the two sections 14 or 16. On the remaining end 24 of the other section, a lip 28 may be formed to engage latch member 26 and hold it in a tight friction fitting relationship. This latching means is best illustrated in FIG. 2.

Sections 14 and 16, being connected as described above, are capable of two positions which are each necessary for the proper operation of the tool as described below. The first of such positions is a closed and latched position where the sections are in an abutting relation forming body member 12. See FIG. 4 for a clear illustration of this position. In this first closed and latched position, sections 14 and 16 form a plurality of holes 34 of varying diameter size between the abutting sides 30 and 32 of sections 14 and 16 respectively. Each of the holes 34 is adapted to receive therethrough in a tight friction fit a portion 50 of the extending rod section 52 of a fishing pole 54. In general, the rod portion of a fishing pole is usually tapered, so that by having a plurality of holes 34 with varying sized diameters a user would be able to place tool 10 in contact with rod 52 in different locations as desired.

Figure 2:
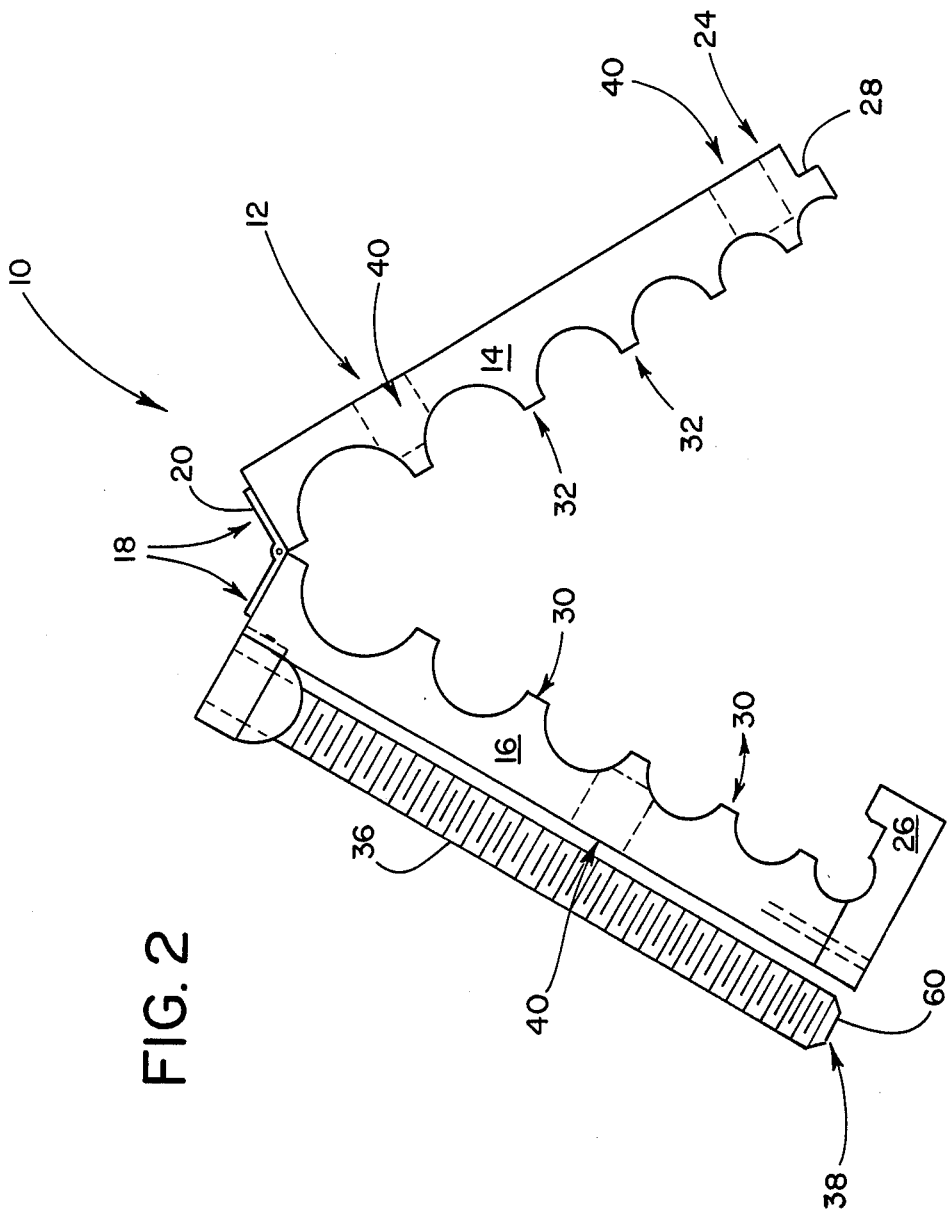
FIG. 2 is a view similar to that of FIG. 1 illustrating the tool in the open position.
Figure 3:
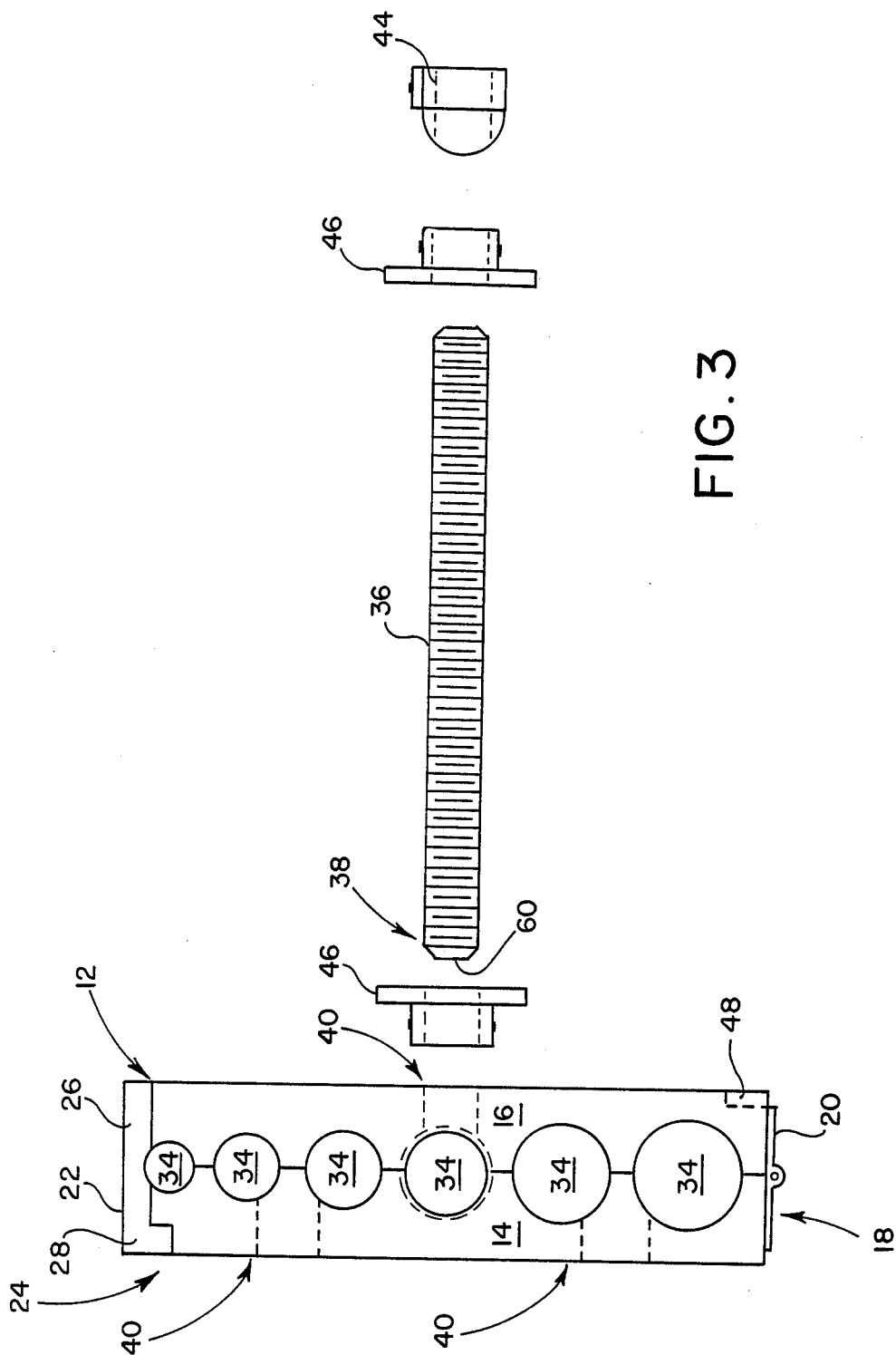
FIG. 3 is an exploded view illustrating how the individual parts of the tool interact to form an operable device.
Figure 4:
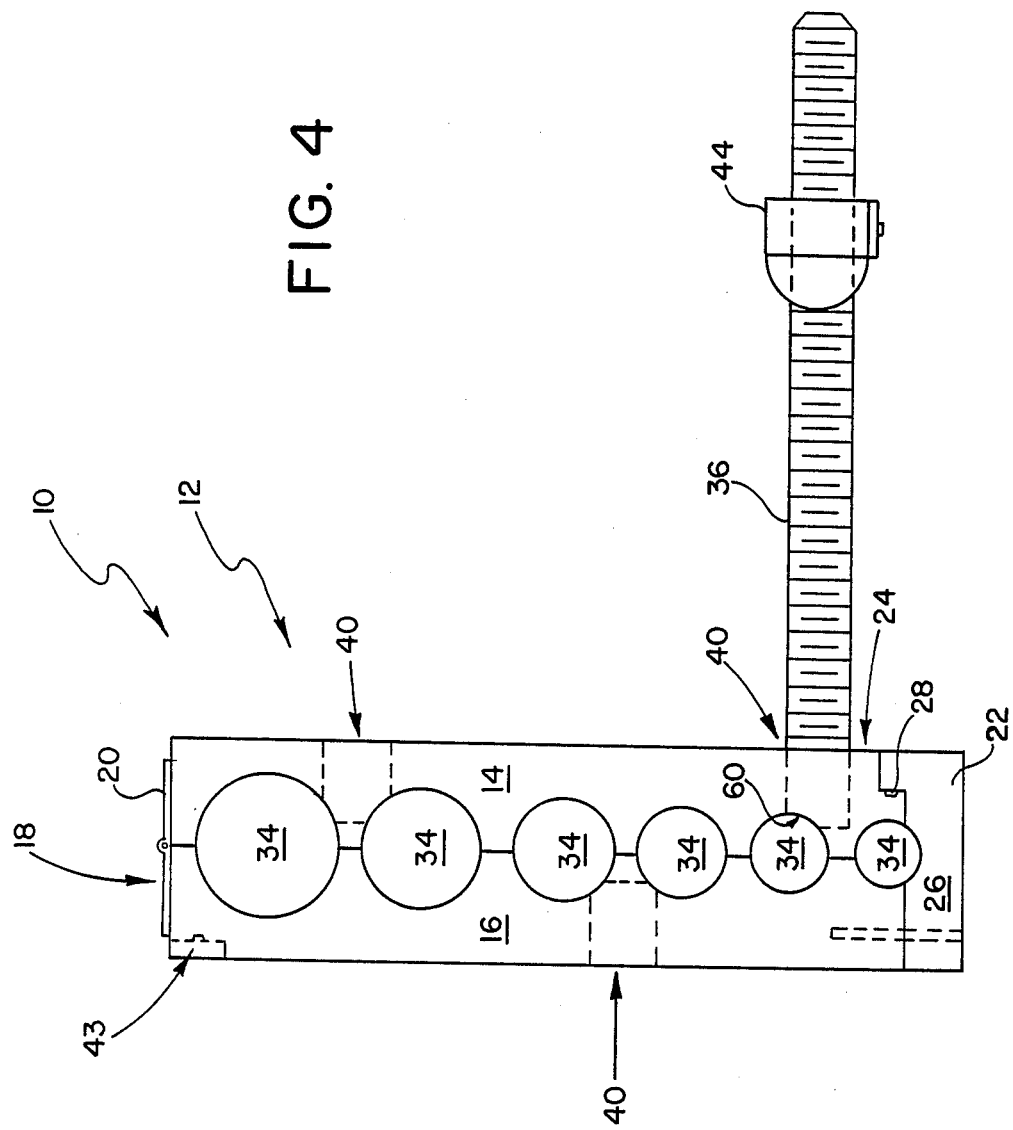
FIG. 4 is a view similar to FIG. 3 illustrating the tool in its fully assembled form for use.

The second position is an open position where sections 14 and 16 are pivotally rotated in opposite directions from their abutting relation of the closed position as is best illustrated in FIG. 2.

In this second open position a user can place the extending rod portion 50 of fishing pole 54 in alignment with those portions of sections 14 and 16 so that when these sections are rotated into the closed position, the extending rod portion 50 of fishing pole 54 is held tightly in such chosen hole. See FIG. 5 for an illustration of this connection. Thus by using these two positions, a user can quickly open tool 10, place it around portion 50 of the extending rod section 52 and latch tool 10 securely to rod 52 by closing the two sections 14 and 16 of tool 10. Tool 10 is now securely, but releasably fastened to fishing pole 54 and provides a stable base for its operation as described below in more detail.

A second member 36 is threadably mated at one end 38 to first member 12 and extends generally perpendicular therefrom. While it is preferred to have member 36 threadably mated with member 12, it can also be merely frictionally held thereto in a similar manner. Preferably, there can be a plurality of slots 40 adapted to threadably mate with end 38 of second member 36 and so situated with respect to holes 34 that end 60 of member 36 can be adjustably threadably advanced into slots 40 to allow for supplemental tighting by the end 60 of member 36 against the portion of rod 52 passing through one of the holes 34 if the need arise during operation of the tool 10. In this manner, the user can have a number of choices in locating member 36 for ease in operating tool 10.

Second member 36 is adapted to receive thereon a refill spool 42 in a rotatable relation thereabout. Preferably, second member 36 will be rod-like so that it can provide an axle for refill spool 42. See FIG. 5 for an illustration of this connection.

In order to provide the user of tool 10 with a means for applying a retarding tension force to refill spool 42, it is preferred that a tension-nut 44 is threadably mated with second member 36 for applying an adjustable frictional force to retard the rotation of refill spool 42. It is necessary to control the rotation of refill spool 42 as the tension applied to the refill spool 42 will impact the tension applied to the fishing line 58 wound onto reel 56. Too much tension or too little tension on wound fishing line can shorten the life of the fishing line. Kinking of monofilament fishing line is the most common cause of failure of this type of line.

Stand-off spacers 46 may also be employed with tool 10 to provide an alignment means to better insure ease of transferring the new fishing 58 line onto reel 56, as best seen in FIG. 5.

In using the preferred embodiment of the invention, the stand-off spacers 46 would normally be used to prevent binding which would otherwise occur between the refill spool 42 and the tension nut 44, or between the refill tool 10 and the side of the tool. Both of the stand-off spacers 46 are adapted to be releasably retained in holes 34 when not in use.

Body member 12 may also be integrally formed to include means for releasably attaching the other component members of tool 10 to itself in a compact form for storage and to prevent the loss of such component members when tool 10 is not in use. For example, as best seen in FIG. 1, Tension nut 44 may have a protrusion on one side adapted to be received into a slot 48 formed in end 18 of section 16. In this manner, member 36 may be threadably mated with tension nut 44 which is in turn held in slot 48, so that these three components of tool 10 may be compactly stored and cannot be misplaced easily.

Tool 10 may best be integrally formed of light-weight plastic material that is both water resistant and capable of flotation. As tool 10 will be used by fishermen around water, it should be water resistant for long life and capable of being retrieved easily if dropped into the fish's domain.

In operation, tool 10 is best used in the following manner. A user can assemble the tool from its stored state, FIG. 1, into its operational state, FIGS. 3 and 4. Once assembled, the user can open sections 14 and 16 as shown in FIG. 2 and clamp these sections around the extending rod portion 50 of the fishing pole 54. By having a plurality of holes 34 with varying sized diameters, the user is able to position tool 10 where it is best suited, as well as use tool 10 with different sized fishing poles, such as a thin fly fishing pole or a thick surf casting pole. Once tool 10 is attached to fishing pole 54, refill spool 42 is placed onto member 36 as best seen in FIG. 5. Spacers 46 may also be used if the user feels they are necessary to properly align the fishing line 58 to be wound onto reel 56. Tension nut 44 is then placed on member 36 and tightened to the desired tension level to insure the proper tensioning of fishing line 58 as it is being wound onto reel 56. Once fishing line 58 is wound onto reel 56, the user simply opens the body 12 of tool 10 by pivoting sections 14 and 16 into the open position and removing tool 10 from its engagement with the extending rod portion 50 of fishing pole 54. Refill spool 42 is removed and tool 10 can be disassembled in a reverse order to its assembly and placed back into its compact storage form.

Tool 10 is seen then to provide a fishing accessory that overcomes the problems of the prior art in that it is portable, fits and works with all sizes of fishing poles and reels, as well as refill spools, and can be operated by a single individual without the need of assistance.

The invention described above is, of course, susceptible to many variations, modifications and changes, all of which are within the skill of the art. It should be understood that all such variations, modifications and changes are within the spirit and scope of the invention and of the appended claims. Similarly, it will be understood that it is intended to cover all changes, modifications and variations of the example of the invention herein disclosed for the purpose of illustration which do not constitute departures from the spirit and scope of the invention.

What is claimed is:

1. A fishing line refill tool for supporting and tensioning a refill spool while fishing line is transferred therefrom to a reel carried on a fishing pole, comprising:
 a plate-like member adapted to be positioned transverse to the axis of the fishing pole and having one opening through which the pole then extends in frictionally retained relation therewith;
 said plate-like member being formed of a plurality of separate sections having abutting edges which cooperatively form both said one opening and a plurality of additional openings of differing diameters whereby the user may select a desired size of opening in said plate-like member in order to use said plate-like member in a different longitudinal position upon the fishing pole or with a pole of a different size;
 means for releasably securing said separable sections of said plate-like member together;

a shift adapted to be disposed within the plane of said plate-like member extending perpendicular to the axis of the fishing pole, said shaft having a threaded inner end;

said plate-like member having a threaded opening and said threaded inner end of said shaft being adapted to be received therein; and said shaft being adapted to rotatably support the refill spool thereon and having tensioning means associated therewith for adjustably controlling the level of tension in the refill line as it is being transferred wherein said threaded opening in said plate-like member communicates with said one opening, whereby said shaft may be rotated and tightened and its threaded inner end brought into engagement with the pole so as to frictionally retain the pole in said one opening.

2. A refill tool as in claim 1 wherein said shaft also has a threaded outer end, and said tensioning means includes a nut carried on the outer end of said shaft.

3. In a fishing line refill tool, improved means for supporting a refill spool from a fishing pole, comprising:

a plate-like member adapted to be positioned transverse to the axis of the fishing pole and having one opening through which the pole then extends in frictionally retained relation therewith;

said plate-like member being formed of a plurality of separable sections having abutting edges which cooperatively form both said one opening and a plurality of additional openings having differing diameters, whereby the user may select a desired size of opening in said plate-like member in order to use said plate-like member in a different longitudial position upon the fishing pole or with a pole of a different size;

means for releasably securing said separable sections of said plate-like member together; and detachable means for supporting the refill spool from said plate-like member, said detachable means has a threaded inner end received in one of said threaded openings, and said threaded innner end of said detachable support means engages the pole for frictionally retaining the pole in said one opening.

4. A refill tool as in claim 3 wherein said detachable support means is a shaft having a threaded outer end which carries a tensioning nut.

* * * * *